US010886811B2

(12) United States Patent
Azar et al.

(10) Patent No.: US 10,886,811 B2
(45) Date of Patent: Jan. 5, 2021

(54) SEGMENTED STATOR ASSEMBLY WITH FLEXIBLE ELECTRICAL CONNECTIONS, GENERATOR AND WIND TURBINE WITH SUCH A STATOR ASSEMBLY

(71) Applicant: Siemens Gamesa Renewable Energy A/S, Brande (DK)

(72) Inventors: Ziad Azar, Sheffield (GB); Erik Groendahl, Them (DK); Subhra Samanta, Ikast (DK); Arwyn Thomas, Cheshire (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/443,044

(22) Filed: Jun. 17, 2019

(65) Prior Publication Data
US 2019/0393751 A1    Dec. 26, 2019

(30) Foreign Application Priority Data
Jun. 21, 2018 (EP) ..................................... 18179012

(51) Int. Cl.
*H02K 1/00* (2006.01)
*H02K 3/47* (2006.01)
(Continued)

(52) U.S. Cl.
CPC ................. *H02K 3/47* (2013.01); *H02K 1/12* (2013.01); *H02K 3/28* (2013.01)

(58) Field of Classification Search
CPC .. H02K 3/28; H02K 3/46; H02K 3/50; H02K 2203/09; H02K 3/345; H02K 1/16;
(Continued)

(56) References Cited

U.S. PATENT DOCUMENTS 4,906,060 A * 3/1990 Claude .................. F03D 7/0272
                                                                290/44
8,916,984 B2 * 12/2014 Semmer ................. F03D 80/85
                                                                290/44
(Continued)

FOREIGN PATENT DOCUMENTS

CN       104737418 A     6/2015
CN       210468910 U     5/2020
(Continued)

OTHER PUBLICATIONS

European Search Report dated Dec. 5, 2018 for Application No. 18 179 012.2.

*Primary Examiner* — Thanh Lam
(74) *Attorney, Agent, or Firm* — Schmeiser, Olsen & Watts LLP (57) ABSTRACT

Provided is a stator assembly including: i) a first stator segment, ii) a second stator segment, wherein the first stator segment and the second stator segment being arranged along a circumferential direction of the stator assembly, and wherein the first stator segment and the second stator segment are located adjacent to each other and are separated by a gap. The stator assembly further including: iii) at least one first coil set of a first multi-phase coil system, and iv) at least one second coil set of a second multi-phase coil system, wherein each coil set includes at least one coil for each phase of the respective multi-phase coil system. Each stator segment includes a first busbar arrangement having first busbar elements, and a second busbar arrangement having second busbar elements, each busbar element being assigned to one phase.

14 Claims, 9 Drawing Sheets

(51) Int. Cl.
*H02K 1/12* (2006.01)
*H02K 3/28* (2006.01)

(58) Field of Classification Search
CPC ...... H02K 7/1838; H02K 19/08; H02K 19/10;
H02K 19/106; H02K 3/00; H02K 3/04;
H02K 3/38; H02K 7/1823; H02K 7/183
USPC .................. 310/71, 179, 180, 184, 216.001,
310/216.024–216.028; 290/44, 55
See application file for complete search history.

(56) References Cited

U.S. PATENT DOCUMENTS

| | | | |
|---|---|---|---|
| 8,987,968 B2* | 3/2015 | Morishita | ............ H02K 7/1838 |
| | | | 310/179 |
| 10,389,210 B2* | 8/2019 | Thygesen | ................ H02K 3/18 |
| 2015/0295482 A1 | 10/2015 | Cawthorne et al. | |
| 2017/0288500 A1* | 10/2017 | Eriksen | ................ H02K 7/1838 |
| 2017/0288501 A1* | 10/2017 | Eriksen | ................ H02K 7/1807 |
| 2019/0393751 A1 | 12/2019 | Azar et al. | |

FOREIGN PATENT DOCUMENTS

| | | | |
|---|---|---|---|
| EP | 3252927 A1 | 12/2017 | |
| EP | 3252928 A1 | 12/2017 | |

\* cited by examiner

SEGMENTED STATOR ASSEMBLY WITH FLEXIBLE ELECTRICAL CONNECTIONS, GENERATOR AND WIND TURBINE WITH SUCH A STATOR ASSEMBLY

CROSS-REFERENCE TO RELATED APPLICATIONS

This application claims priority to EP Application No. 18179012.2, having a filing date of Jun. 21, 2018, the entire contents of which are hereby incorporated by reference.

FIELD OF TECHNOLOGY

The following relates to the technical field of electric generators for wind turbines. Specifically, the following relates to a stator assembly comprising a plurality of stator segments which are electrically connected in order to transfer electric power being generated with electric coils. The following further relates to an electric generator and a wind turbine with such a stator assembly.

BACKGROUND

Wind turbines can be erected on-shore or off-shore. Large wind turbines being capable of providing an electric power of more than 6 MW are typically installed off-shore. In particular for maintenance reasons self-excited generators having a rotor assembly with permanent magnets are employed. In the near future wind turbines being capable of providing an electric power in the order of more than 10 MW will be provided by wind turbine manufactures having a special expertise in the field of off-shore wind turbines.

Such large wind turbine generators are typically realized as self-excited generators with an inner stator—outer rotor configuration. Thereby, a plurality of stator segments each comprising several electric coils or windings are mounted one next to each other along a circumferential direction at a circular outer edge of a stator frame structure. At a circular inner surface of a rotor frame assembly, which is torque proof connected to a wind rotor and which, in operation, rotates around the stator frame structure, there are mounted a plurality of permanent magnets which, when moving along the stator segments, produce a time alternating magnetic flux through each electric coil. This time alternating magnetic flux induces an electric current in each electric coil. The currents produced in each electric coil respectively by each one of the plurality of stator segments are collected or summed up and yield an electric power output of the generator. Such a system is for example described in detail in the document EP 3 252 928 A1.

Large stators are generally segmented to ease manufacturing, transportation and assembly. However, due to manufacturing limitation, there is always a gap between two adjacent stator segments. This gap creates an unbalance in the phase voltages of the electrical system (e.g. a three phase system). If the stator consists of two (or more) coil systems, then this gap also creates an unbalance among the phases of the different coil systems. Furthermore, under single converter operation, due to imbalance in the coil layout, there is more rotor eddy current loss present. As a consequence, the output power of the wind turbine has to be decreased in order to maintain the generator, in particular magnet, temperature in a secure limit.

So far, these issues are taken into account by applying a control during the operation of the electric generator such as by using an improved control algorithm to minimize e.g. the second harmonic ripple. However, the problem is not solved yet at the design phase of the electric generator.

The document EP 3 252 927 A1 describes a segmented armature assembly comprising an annular an annular armature comprising a plurality of armature segments separated by gaps, and winding sets of at least two multi-phase winding systems. Hereby, each winding set comprises one winding for each phase of a multi-phase winding system. In a first winding distribution, each armature segment carries winding sets of one winding system only such that the adjacent armature segments carries only winding sets of the other winding system. In a second winding distribution, each armature segment carries an alternating arrangement of winding sets, wherein the arrangement carried by one armature segment is a mirror image of the arrangement carried by the adjacent armature segments. However, said document is completely silent with regard to the electrical connections between two adjacent stator segments.

Figure 14:
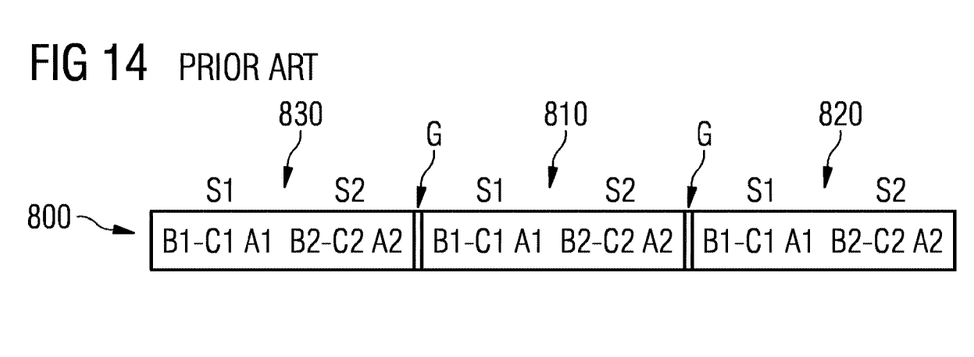
FIG. 14 shows a stator segment connection from the known art.
Figure 15:
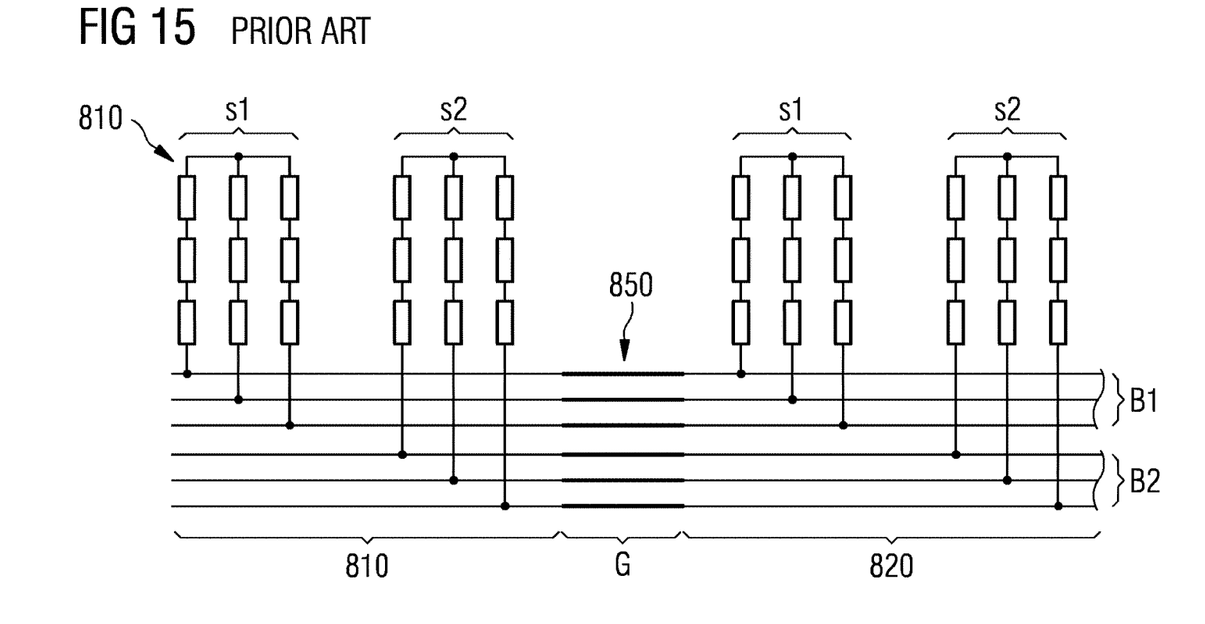
FIG. 15 shows a stator segment connection from the known art.

FIGS. 14 and 15 show an example from the known art with regard to the connection between two stator segments. The stator assembly 800 has: a first stator segment 810, and a second stator segment 820, wherein the first stator segment 810 and the second stator segment 820 are arranged along a circumferential direction of the stator assembly 800, and wherein the first stator segment 810 and the second stator segment 820 are located adjacent to each other and are separated by a tolerance gap G.

FIG. 14 is an abstract representation of the stator segments 800 and their coil arrangements for a dual stator carrying two multi-phase coil systems S1, S2. The straight segments 800 shown in the Figure are, in reality, curved sections of the annular stator. It may be assumed that the pattern shown in this Figure is repeated about the entire stator. A first coil set of the first multi-phase coil system S1 comprises three windings labelled A1, B1, -C1. Similarly a second coil set s1 of the second multi-phase coil system S2 comprises three windings A2, B2, -C2. The windings with their labels are depicted using a typical sign convention to indicate current flow direction.

According to FIG. 15, in the stator assembly 810, each coil set comprises at least one coil for each phase of the respective multi-phase coil system S1, S2. Each stator segment 810, 820 comprises a first busbar arrangement B1 having first busbar elements, and a second busbar arrangement B2 having second busbar elements, wherein each busbar element is assigned to one phase.

However, this arrangement still leads to voltage imbalances between the phase windings (e.g. the voltage between winding A and winding B is not the same as the voltage between winding B and winding C, etc.) and to voltage imbalances between the two multi-phase coil systems S1, S2. The result is an undesirable development of harmonics on the output power, torque ripple, etc. Furthermore, should one of the systems S1, S2 fail, there will be a significant rotor eddy current loss, leading to a necessary de-rating of the output power.

There may be a need for providing a stator assembly having a plurality of stator segments and at least two electrical systems, wherein the phase voltages of the electrical systems are balanced, and wherein the stator assembly can be realized in a compact manner.

SUMMARY

According to a first aspect of embodiments of the invention there is provided a stator assembly comprising: a first stator segment and a second stator segment, wherein the first stator segment and the second stator segment being arranged along a circumferential direction of the stator assembly, and wherein the first stator segment and the second stator segment are located adjacent to each other and are separated by a (tolerance) gap. The stator assembly further comprises: at least one first coil set of a first multi-phase coil system, and at least one second coil set of a second multi-phase coil system, wherein each coil set comprises at least one coil for each phase of the respective multi-phase coil system. Each stator segment comprises a first busbar arrangement having first busbar elements, and a second busbar arrangement having second busbar elements, each busbar element being assigned to one phase. The stator assembly further comprises: a segment-to-segment connector connecting each busbar element of one first busbar arrangement of the first stator segment to one busbar element assigned to the same phase of one busbar arrangement of the adjacent second stator segment, thereby electrically bridging the gap. Hereby, in each segment, each coil of the coil sets is connected to one busbar element assigned to the same phase of the first busbar arrangement or the second busbar arrangement.

In a first multi-phase coil system distribution, each stator segment carries both, the first and the second multi-phase coil systems, and wherein, with respect to the gap between the first stator segment and the second stator segment, the arrangement of coil sets carried by the first stator segment is a mirror image of the arrangement of coil sets carried by the adjacent second stator segment.

Alternatively, in a second multi-phase coil system distribution, each single stator segment carries either only coil sets of the first multi-phase coil system or of the second multi-phase coil system.

According to an embodiment of the invention, the described stator assembly is based on the idea that a stator assembly, having a plurality of stator segments and at least two electrical systems, can be provided, wherein the phase voltages of the electrical systems are balanced. Furthermore, in the same manner, the stator assembly can be provided in an efficient and compact manner. These advantageous embodiments may be realized, when the connections between the stator segments are realized using one or more segment-to-segment connectors in a flexible manner. Each busbar element of one busbar arrangement of the first stator segment can be connected to a busbar element, which is assigned to the same phase, of one of the busbar arrangements of the adjacent second stator segment in order to electrically bridge the gap in between the segments. Because each coil of the coil sets is connected to one busbar element assigned to the same phase of one of the busbar arrangements, there are many possible options of how to flexibly connect adjacent stator segments and thereby it can be achieved that the phase voltages of the electrical systems are balanced.

Specifically, because the described segment-to-segment connectors are applied in a flexible manner within either the described first multi-phase coil system distribution or in the described second multi-phase coil system distribution, the balance of the phase voltages of the electrical systems is highly improved.

According to an embodiment of the invention, a large electrical output power due to improvements in the phase voltage imbalance may be achieved. For example, there may be a significant reduction in 2f and 4f harmonics and the need to actively control the 2f ripple may be overcome. As a result, a smaller (cheaper) DC link capacitor can be used in a wind turbine, wherein the life time/reliability of said DC link capacitor may be longer/better. Furthermore, a significant reduction in the rotor eddy-current loss under single system operation may be achieved, resulting in better thermal capability under single system operation (better fault tolerance operation capability).

The stator assembly with the described segment-to-segment connection may be mounted, according to an embodiment of the invention, to the electric generator of an industrially highly relevant facility such as a wind turbine in an easy and effective manner.

In the context of the present application, the term "busbar arrangement" may particularly denote an arrangement of two or more busbar elements. The term "busbar" may particularly refer to a strip or bar (or cable), in particular comprising metal, for local high current power distribution. An appropriate electric connection between different coils may be realized by means of local busbar elements. These busbar elements, which may be assigned to the respective stator segment, can be configured such that the respective stator segment will be realized with a compact spatial design. Each stator segment within the stator assembly may comprise two or more busbar arrangements, wherein each coil of the stator segment is connected to one of the busbar elements of one of the busbar arrangements. In an embodiment, a busbar element may be realized as a cable. In another element a busbar element may be realized as a strip or bar. The busbar element may comprise e.g. copper or aluminum. A busbar arrangement may be realized as a structure that collects and/or guides one or more busbar elements.

In the context of the present application, the term "circumferentially arranged segments" may particularly refer to that a plurality of stator segments may be arranged one next to each other along a circular circumference around the center axis of a stator assembly.

In the context of the present application, the term "coil set" may particularly refer to a set of coils, wherein each "coil" is assigned to a specific phase of a multi-phase system. For example, in a three-phase system, there may be three coils, each assigned to one of the three phases, within the coil system. Each coil system may be further assigned to a specific multi-phase coil system and may be arranged at a specific stator segment. Furthermore, each coil of the coil system may comprise one or more coil elements. Said coil elements can further be arranged in coil element subsets. For example, a coil can comprise two coil element subsets, being connected in parallel, wherein each coil element subset comprises three coil elements, being connected in series. Each coil element may be denoted as a part of the coil which represents one turn. A coil may for example comprise twenty turns.

According to a further aspect of embodiments of the invention, an electric generator, in particular an electric generator for a wind turbine, is provided. The electric generator comprises: the stator assembly described above, and a rotor assembly, which is configured and supported such that it can rotate around a center axis, in particular wherein the electric generator has an inner stator—outer rotor configuration.

Just for the sake of clarity it is mentioned that in the described (optional) inner stator—outer rotor configuration the stator segments comprising electric coils are oriented radially in the outer direction. Magnets of the rotor assembly produce, during normal operation, a time varying magnetic field at the stator segments. Thereby, the magnets may be in particular permanent magnets, which are arranged at the inner side of an outer wall of the rotor assembly. Furthermore, in between the stator segments and the (permanent) magnet there is provided an air gap.

According to a further aspect of embodiments of the invention, a wind turbine for generating electrical power, in particular an off-shore wind turbine, is provided. The wind turbine comprising: a tower; a wind rotor, which is arranged at a top portion of the tower and which comprises at least one blade; and an electric generator as described above, wherein the electric generator is mechanically coupled with the wind rotor.

In particular in a so called direct drive wind turbine having no gear box in between i) a wind rotor capturing mechanical energy from wind and ii) the electric generator the described center axis may correspond or may be aligned with the rotational axis of the wind rotor. With regard to the spatial relationship between the plurality of coil assemblies and the outer annular frame the center axis may define the direction of a (shortest) distance the respective coil assembly and (an axial side face of) the outer annular frame.

In the context of this document "radially" and "radial direction" means perpendicular to the "axial direction" being in line with the "center axis". In a cylindrical coordinate system being used in this document for describing the geometry of the stator assembly the "axial direction" along the center line corresponds to the "height coordinate" and the "radial direction" corresponds the Euclidean distance between the "center axis" and a point of interest. Further, "outer" means radially outer, i.e. a larger Euclidean distance and "inner" means radially inner, i.e. a smaller Euclidean distance.

The number of coil elements and/or turns in a coil are examples of exemplary embodiments. The skilled person understands that also other numbers of coil elements and/or turns in a coil are possible and that these can be implemented according to the desired properties of the stator assembly.

According to an embodiment of the invention, in the first multi-phase coil system distribution D1, i) each coil of the first coil set of the first stator segment is connected to the first busbar element, which is assigned to the same phase, of the first busbar arrangement of the first stator segment, ii) each coil of the second coil set of the first stator segment is connected to the second busbar element, which is assigned to the same phase, of the second busbar arrangement of the first stator segment, iii) each coil of the second coil set of the second stator segment is connected to the second busbar element, which is assigned to the same phase, of the second busbar arrangement of the second stator segment, and iv) each coil of the first coil set of the second stator segment is connected to the first busbar element, which is assigned to the same phase, of the first busbar arrangement of the second stator segment.

This embodiment of the first multi-phase coil system D1 may provide the advantages that the phase voltages of the electrical systems may be balanced. In this manner, the above identified technical advantages may be efficiently achieved while using a compact and robust design.

According to a further embodiment, in the first multi-phase coil system distribution D1, i) each first busbar element of the first busbar arrangement of the first stator segment is connected to the second busbar element, which is assigned to the same phase, of the second busbar arrangement of the second stator segment, and ii) each second busbar element of the second busbar arrangement of the first stator segment is connected to the first busbar element, which is assigned to the same phase, of the first busbar arrangement of the second stator segment.

In this embodiment, the busbar arrangements of two stator segments are connected in a crosswise manner. For example, the first busbar elements of the first busbar arrangement of the first stator segment are connected to the second busbar elements of the second busbar arrangement of the second stator segment, respectively. In the same manner, the second busbar elements of the second busbar arrangement of the first stator segment are connected to the first busbar elements of the first busbar arrangement of the second segment, respectively.

According to a further embodiment based on the embodiment described above, iii) each coil of the first coil set of the first stator segment is connected to the first busbar element, which is assigned to the same phase, of the first busbar arrangement of the first stator segment, iv) each coil of the second coil set of the first stator segment is connected to the second busbar element, which is assigned to the same phase, of the second busbar arrangement of the first stator segment, v) each coil of the second coil set of the second stator segment is connected to the first busbar element, which is assigned to the same phase, of the first busbar arrangement, and vi) each coil of the first coil set of the second stator segment is connected to the second busbar element, which is assigned to the same phase, of the second busbar arrangement of the second stator segment.

Also, this embodiment of the first multi-phase coil system D1 may provide the advantages that the phase voltages of the electrical systems may be balanced. In this manner, the above identified technical advantages may be efficiently achieved while using a compact and robust design.

According to a further embodiment, in the first multi-phase coil system distribution D1, each coil comprises at least two coil elements, and the coil elements, in particular three coil elements, of each coil assigned to the same phase are connected in series. This has the advantage that an efficient and compact electrical connection is established within each coil set.

According to a further embodiment, in the second multi-phase coil system distribution D2, each coil comprises at least two coil elements, and wherein the coil elements, in particular six coil elements, of each coil assigned to the same phase are connected in series. This has the advantage that also in a different coil system distribution, wherein each stator segment comprises only coil sets of one multi-phase coil system, an efficient and compact electrical connection is established within each coil set.

This embodiment of the second multi-phase coil system D2 also provides the advantage that the phase voltages of the electrical systems may be balanced. The technical advantages identified above may therefore also efficiently be achieved while using a compact and robust design.

According to a further embodiment, in the second multi-phase coil system distribution D2, each coil comprises at least two coil elements and each coil comprises at least two coil element subsets. Hereby, each coil element is assigned to a coil element subset comprising at least two coil elements, the coil element subsets of each coil are connected in parallel, and the coil elements of each coil element subset, in particular three coil elements, are connected in series. This has the advantage that an especially efficient design for the stator assembly is provided.

This embodiment of the second multi-phase coil system D2 also provides the advantage that the phase voltages of the electrical systems are balanced and that the above identified technical advantages can be efficiently achieved while using a compact and robust design.

According to a further embodiment, the segment-to-segment connector is a flexible electrical connector, in particular comprising copper or aluminium, which is configured to changeably connect one of the busbar elements of the busbar arrangements of the first stator segment to one of the busbar elements assigned to the same phase of the first busbar arrangement or of the second busbar arrangement of the second stator segment. This has the advantage that the busbar arrangements of adjacent stator segments can be connected in a flexible and dynamic manner. Thereby a design is provided that may enable balanced phase voltages as well as a dynamic mode of operation. A flexible connector may furthermore be used to handle different thermal expansion of adjacent segments as well as different vibration profile of adjacent segments.

A segment-to-segment connector may for example be made of thin sheets of electrical copper which are pressed together at the ends to result in a solid connection (e.g. by press welding). The middle of the segment-to-segment connector, however, may be kept mechanically flexible. The ends of the segment-to-segment connector may comprise holes to mechanically connect the connector to the busbar arrangement of a stator segment, e.g. by using nuts and bolts.

The connector may be at least partially mechanically flexible such that even in very large stator assemblies (several meters in diameter) a compact and robust electrical connection is enabled. Furthermore, the connector may be applied in a very flexible manner, because different busbar elements of different busbar arrangements can be connected with each other depending on the operation conditions. A flexible busbar connector may absorb different thermal expansion/contraction profiles of adjacent segment busbars. Mechanical stress on flexible busbar may also be less due to different vibration levels of adjacent segments.

According to a further embodiment, each multi-phase coil system comprises three phases. In this manner, each coil set comprises i) a first coil being assigned to the first electric phase of a three-phase current, ii) a second coil being assigned to the second electric phase of the three-phase current, and iii) a third coil being assigned to the third electric phase of the three-phase current. Furthermore, each busbar arrangement comprises i) a first busbar phase element being assigned to the first electric phase of a three-phase current, ii) a second busbar phase element being assigned to the second electric phase of the three-phase current, and iii) a third busbar phase element being assigned to the third electric phase of the three-phase current. In this manner, the described stator assembly can be implemented in a robust and compact manner into industrially relevant, in particular standardized, machines and/or applications.

According to a further embodiment, the stator assembly comprises, besides the first stator segment and the second stator segment, at least four further stator segments. A large electric generator, e.g. for a wind turbine, may comprise for example six, eight, ten, twelve or more stator segments. Also, in this manner, the described stator assembly may be implemented in a robust and compact manner into industrially relevant, in particular standardized, machines and/or applications.

According to a further embodiment, the stator assembly comprises a third multiphase coil system. Such a third system may be redundant and only used in case of emergencies as a substitute for one of the other systems. There may be third coil sets assigned to the third multi-phase coil system, wherein each coil set comprises a coil assigned to each phase. Furthermore, there may be a third busbar arrangement with third busbar elements. Hereby, the third multi-phase coil system may be arranged additionally to, and in the same manner, as the first and second multi-phase coil systems.

According to a further embodiment, the stator assembly may comprise a forth multi-phase coil system. The stator assembly may also comprise more than four multiphase systems. The stator assembly may also have two systems with multi-phase coil as well as multi systems with multi-phase coil.

According to a further embodiment the outer annular frame of the electric generator has an outer diameter larger than 7 m, in particular larger than 8 m, and more particular larger than 9 m.

Regarding the radial extension or dimension of the electric generator it should be clear that the larger the electric generator is the larger the electric coil arrangements must be in order to provide for a reliable electric contact of the stator segments. Specifically, a large stator assembly requires long electric cables. In this context it should be clear that with the (flexible) segment-to-segment connection of the described stator assembly segments, even such a large electric generator can be arranged in an easy and reliable manner.

The radially outer dimension of the outer frame structure of the stator assembly or alternatively the radially outer side of the rotor assembly may define the geometric dimension of the described electric generator along the radial direction perpendicular to the center axis respectively the rotational axis.

It has to be noted that embodiments of the invention have been described with reference to different subject matters. However, a person skilled in the art will gather from the above and the following description that, unless other notified, in addition to any combination of features belonging to one type of subject matter also any combination between features relating to different subject matters is considered as to be disclosed with this document.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

The illustration in the drawing is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to other element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

According to an exemplary embodiment, the following advantages may be obtained: a large electrical output power due to improvements in the phase voltage imbalance; lower power ripple and significant reduction in 2f and 4f harmonics; a smaller (cheaper) DC link capacitor can be used; the life time/reliability of said DC link capacitor can be longer/better; the need to actively control the 2f ripple can be overcome; and a significant reduction in the rotor eddy-current loss under single system operation, resulting in better thermal capability under single system operation (better fault tolerance operation capability).

Figure 1:
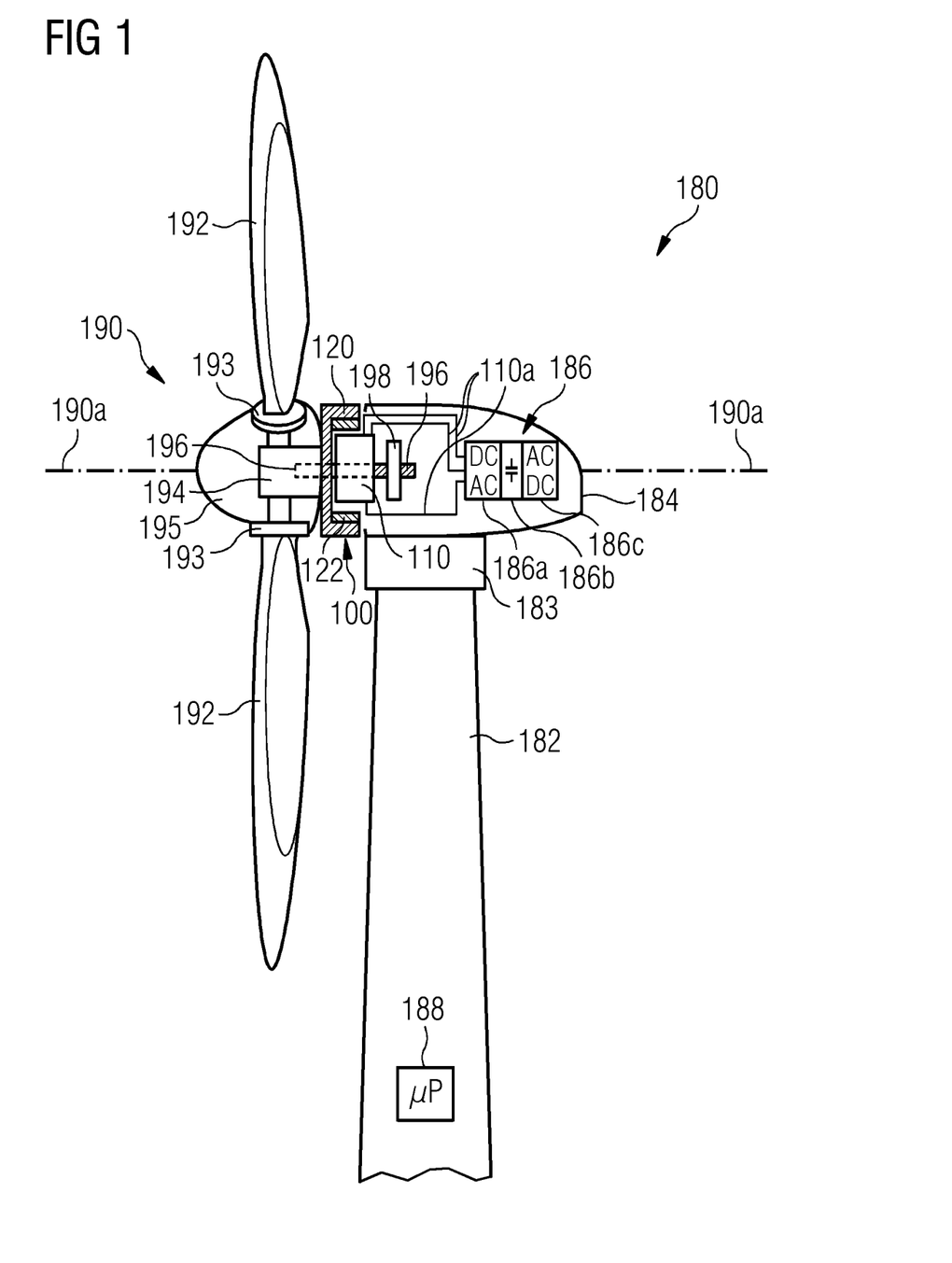
FIG. 1 shows in accordance with an embodiment of the invention a wind turbine comprising an electric generator.

FIG. 1 shows a wind turbine 180 according to an embodiment of the invention. The wind turbine 180 comprises a tower 182, which is mounted on a non-depicted fundament. On top of the tower 182 there is arranged a nacelle 184. In between the tower 182 and the nacelle 184 there is provided a yaw angle adjustment device 183, which is capable of rotating the nacelle 184 around a not depicted vertical axis, which is aligned basically with the longitudinal extension of the tower 182. By controlling the yaw angle adjustment device 183 in an appropriate manner it can be made sure, that during a normal operation of the wind turbine 180 the nacelle 184 is always properly aligned with the current wind direction.

The wind turbine 180 further comprises a wind rotor 190 having two or three or more blades 192. In the perspective of FIG. 1 only two blades 192 are visible. The wind rotor 190 is rotatable around a rotational axis 190a. The blades 192, which are mounted at a hub 194, extend radially with respect to the rotational axis 190a.

In between the hub 194 and a blade 192 there is respectively provided a blade adjustment device 193 in order to adjust the blade pitch angle of each blade 192 by rotating the respective blade 192 around a not depicted axis being aligned substantially parallel with the longitudinal extension of the blade 192. By controlling the blade adjustment device 193 the blade pitch angle of the respective blade 192 can be adjusted in such a manner that at least when the wind is not so strong a maximum wind power can be retrieved from the available wind power. However, the blade pitch angle can also be intentionally adjusted to a position, in which only a reduced wind power can be captured.

A spinner structure 195 covers the hub 195. By means of the spinner structure 195, which may also be denominated a nose cone, functional elements such as the blade adjustment devices 193 will be protected from rough external environmental impacts.

At the nacelle 184 there is provided an electric generator 100. In accordance with basic principles of electrical engineering the electric generator 100 comprises a stator assembly 110 and a rotor assembly 120. As can be seen from FIG. 1, the electric generator 100 is located between a front end of the nacelle 184 and the hub 194.

According to the embodiment described here the electric generator 100 is realized with a so-called inner stator—outer rotor configuration. Permanent magnets 122 being attached to a rotor frame structure of the rotor assembly 120 travel around not depicted stator segments being attached at a stator frame structure of the stator assembly 110. In between the stator segments, which comprise coils or windings for picking up a time alternating magnetic induction, and the permanent magnets, there is formed an air gap.

It should be clear that the large size of the spatial arrangement of the entirety of all stator segments requires a suitable electric coil arrangement for forwarding the electric power being generated by (the coils of) the stator segments to an electric power transceiver. According to the exemplary embodiment described here this electric power transceiver is a power converter 186.

The wind rotor 190 is rotationally coupled with the rotor assembly 110 directly or by means of a rotatable shaft 196.

It is further mentioned that the wind turbine 180 is a so-called direct drive wind turbine wherein between wind rotor 190 and rotor assembly 110 there is not provided a gear box. However, it is mentioned that the electric generator 100 could also be driven indirectly via a gear box, which may be used to convert the number of revolutions of the wind rotor 190 typically into a higher number of revolutions of the rotor assembly 120.

Figure 2:
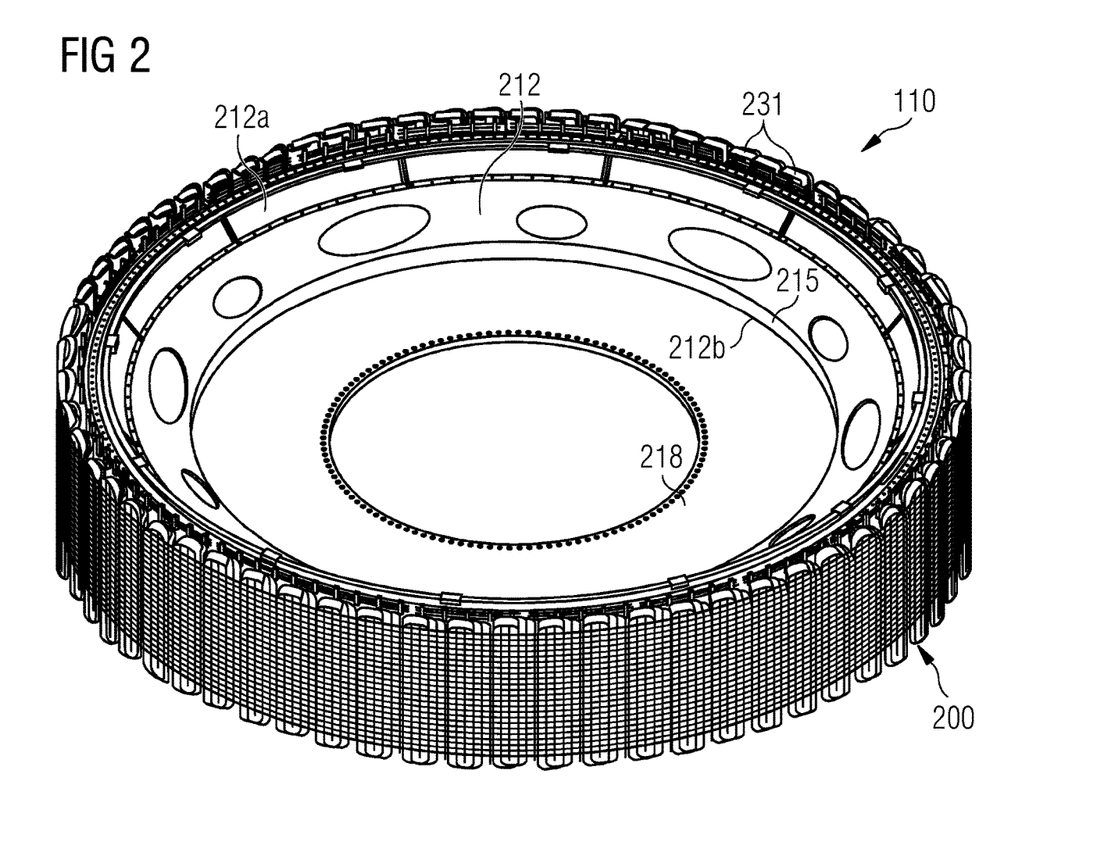
FIG. 2 shows in accordance with an embodiment of the invention a stator assembly with a plurality of stator segments mounted at a radial outer edge.

FIG. 2 shows the stator assembly 110 of the electric generator 100 in more detail. The stator assembly 110 is an annular structure which is located in a concentric manner with regard to the rotational axis 190a. The stator assembly 110 comprises an inner annular frame 218 which surrounds a non-depicted bearing assembly. This bearing assembly provides rotational support for the rotor assembly 120 as depicted in FIG. 1. An outer annular frame 212 having a circular outer edge 212a and an inner edge 212b surrounds the inner annular frame 218. An annular flange 215 is provided in between the inner annular frame 218 and the outer annular frame 212.

As can be further seen from FIG. 2, the stator assembly comprises a plurality of stator segments 200 each having several electric windings 231. The entire circumference respectively the entire radially outer edge 212a of the stator assembly 110 is covered with these stator segments 200. As a consequence, along the circumferential direction the electric windings 231 are arranged one next to each other without any significant gap. This allows for an effective conversion of mechanical energy, which drives the rotor assembly 120 shown in FIG. 2, into electric energy generated from the time alternating magnetic flux which is picked up by the plurality of stator segments 200.

Figure 3:
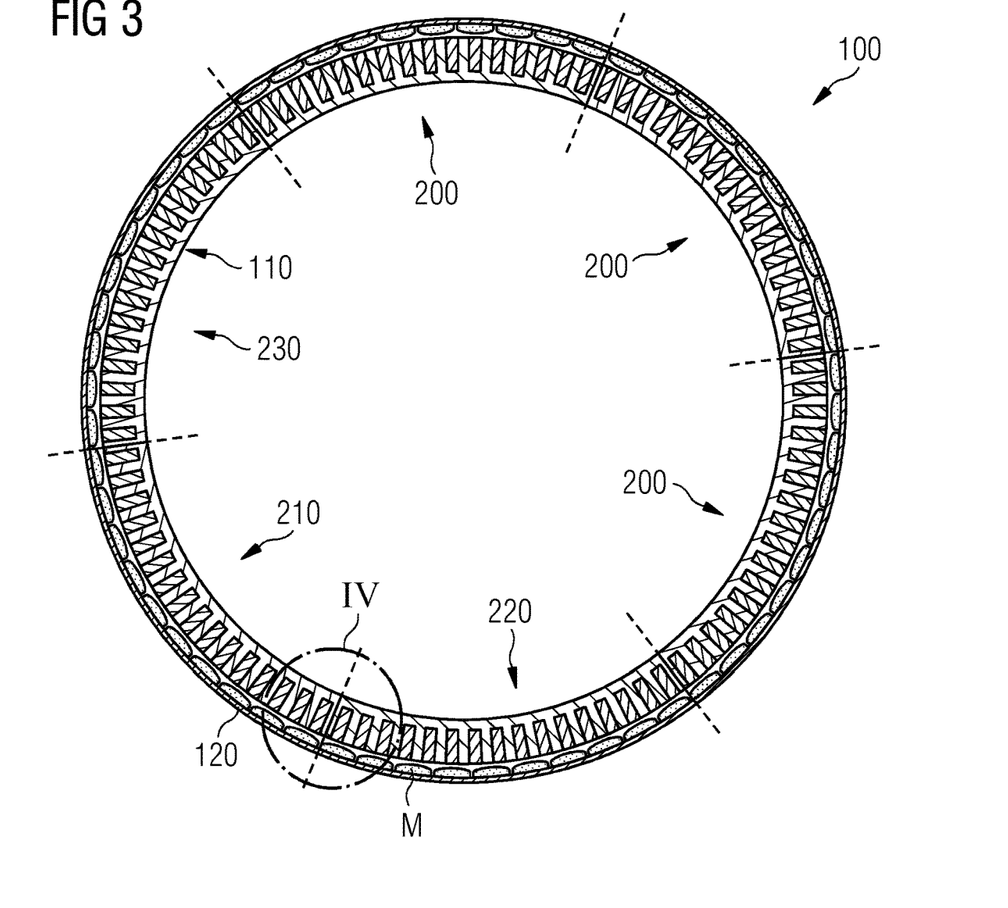
FIG. 3 shows an embodiment of the stator assembly with six stator segments.

FIG. 3 shows an electric generator 100 with the stator assembly 110 surrounded by the rotor assembly 120 which is configured to rotate around the stator assembly 110. FIG. 3 specifically shows the segmentation of the stator assembly 110 according to FIG. 2. In this embodiment, the stator assembly 110 comprises six segments 200 including a first stator segment 210 which is arranged in between an adjacent second stator segment 220, and an adjacent further stator segment 230.

Figure 4:
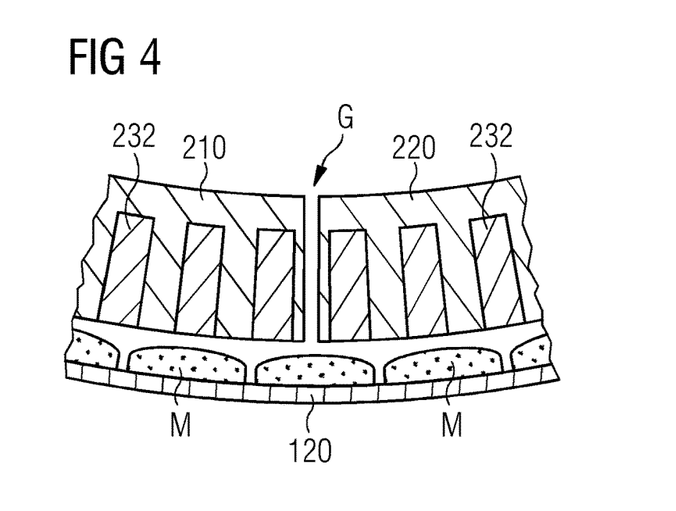
FIG. 4 shows a detailed view of FIG. 3 with regard to the gap between two adjacent stator segments.

FIG. 4 shows a detailed view of the generator assembly 100 comprising the segmented stator assembly 110. The Figure shows a junction between adjacent stator segments 210 and 220, and indicates the unavoidable gap G between adjacent segments 210 and 220. The Figure also shows the stator slots 232 containing the windings and the magnets M of the rotor assembly 120, arranged to face the windings across an air-gap.

Figure 5:
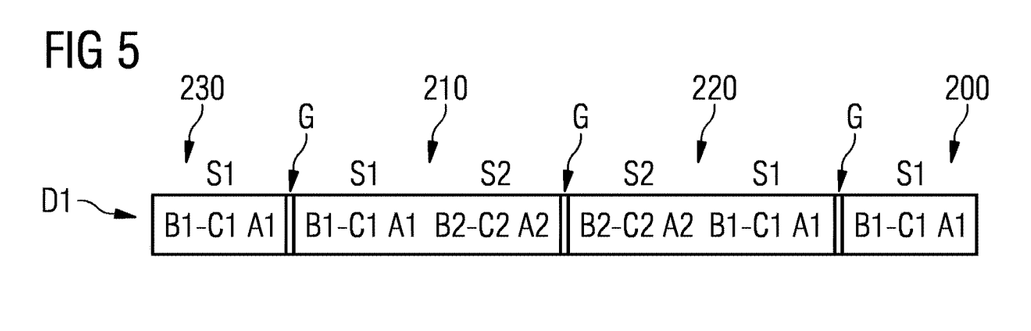
FIG. 5 shows a first multi-phase coil system distribution D1 according to an embodiment of the invention.
Figure 7:
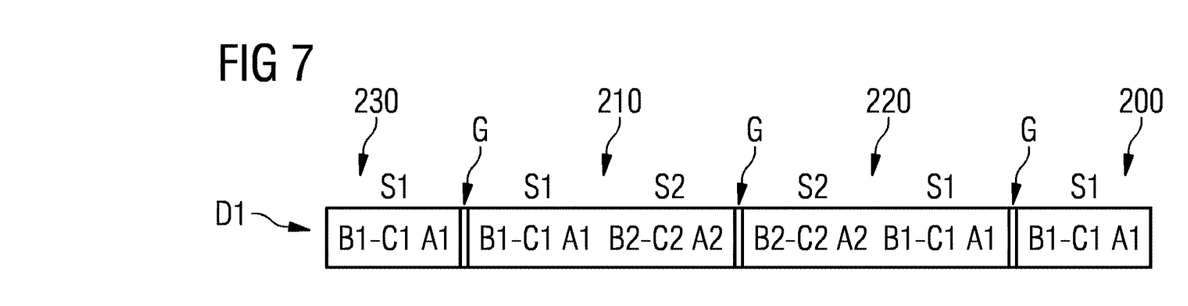
FIG. 7 shows a first multi-phase coil system distribution D1 according to a further embodiment of the invention.
Figures 9, 10:
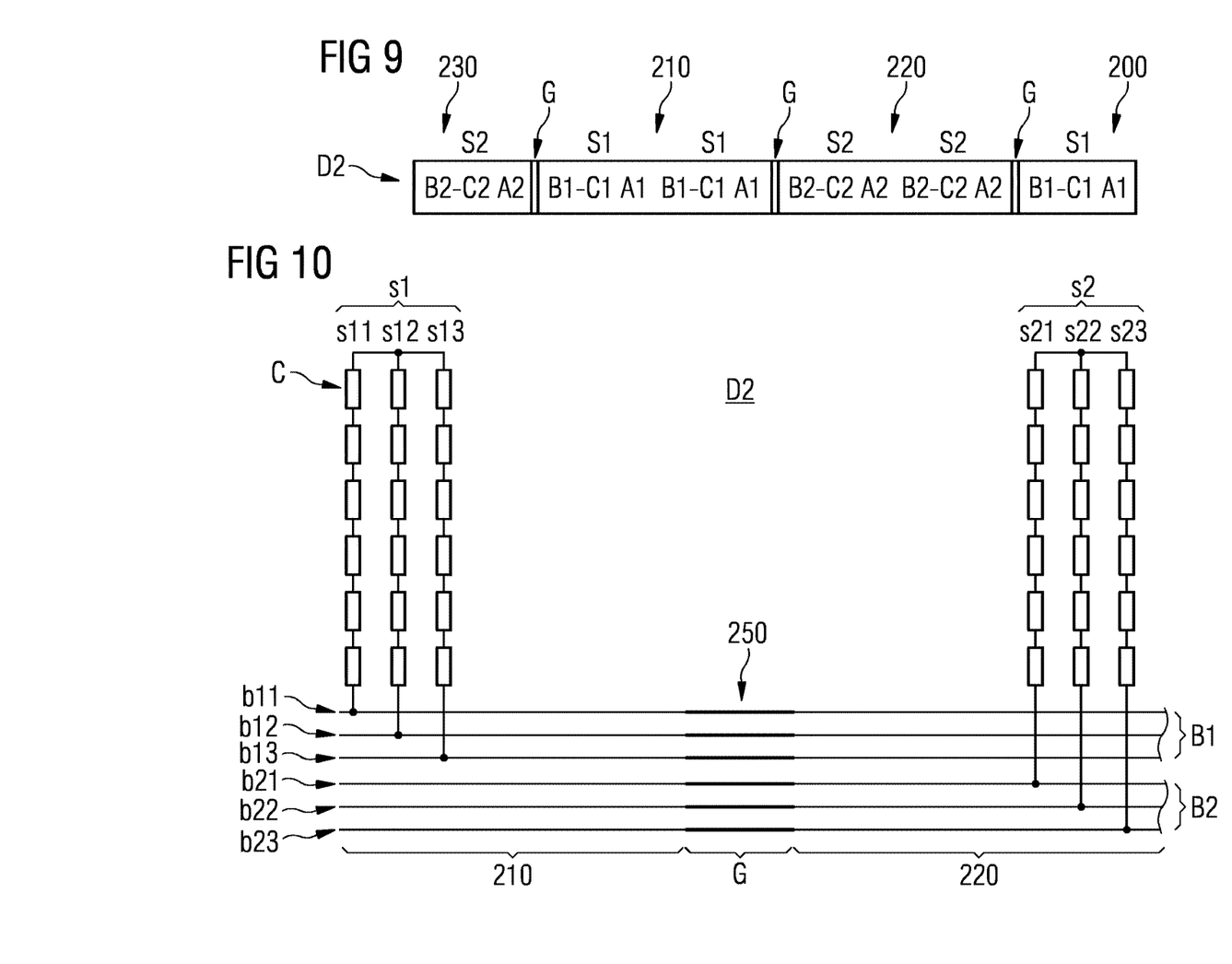
FIG. 9 shows a second multi-phase coil system distribution D2 according to an embodiment of the invention.
FIG. 10 shows a second multi-phase coil system distribution D2 according to an embodiment of the invention.
Figures 11, 12:
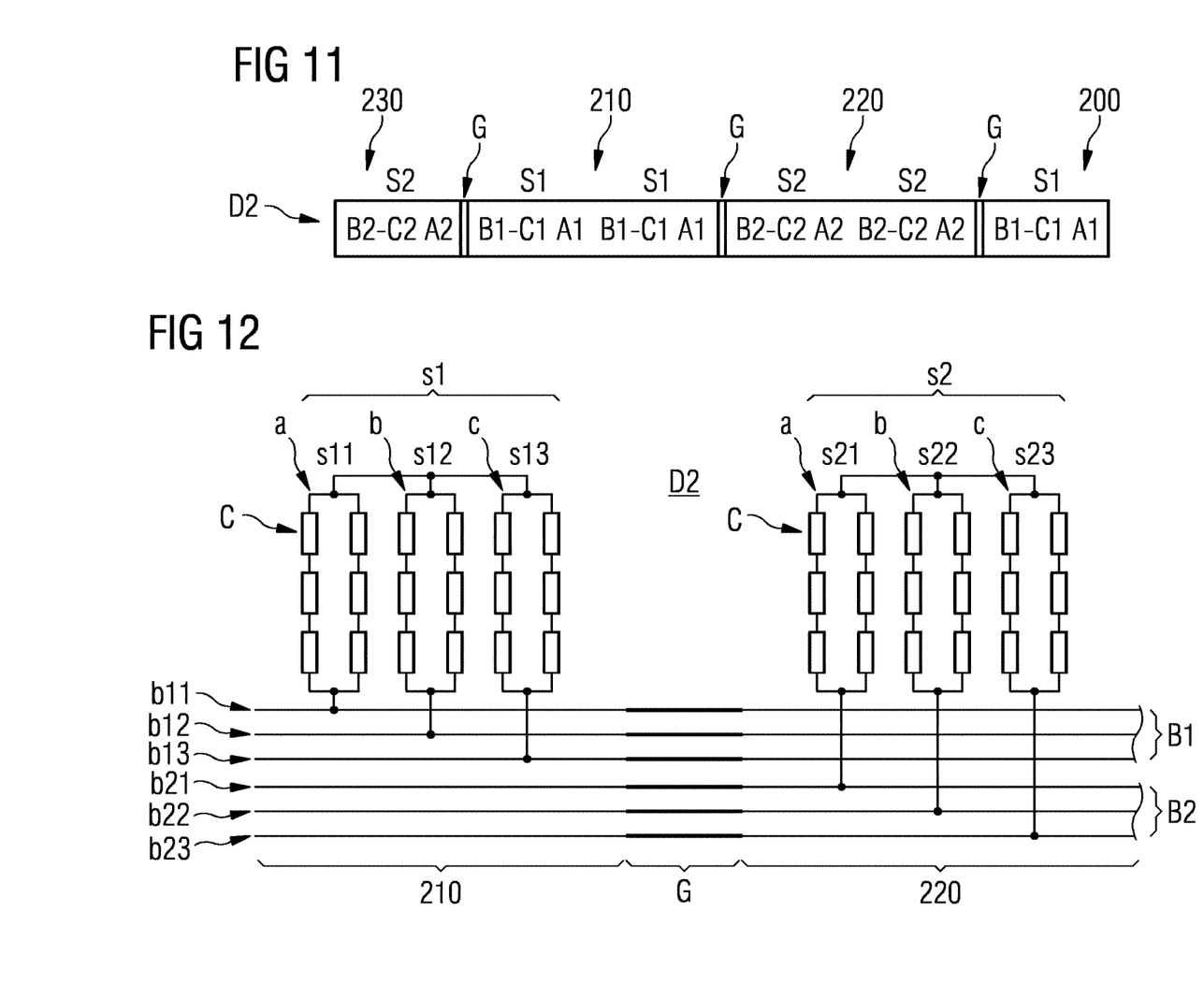
FIG. 11 shows a second multi-phase coil system distribution D2 according to a further embodiment of the invention.
FIG. 12 shows a second multi-phase coil system distribution D2 according to a further embodiment of the invention.

FIGS. 5 and 7, referring to a first multi-phase coil system distribution D1, and FIGS. 9 and 11, referring to a second multi-phase coil system distribution D2, are abstract representations of the stator segments 200 and their coil arrangements for a dual stator carrying two multi-phase coil systems S1, S2. The straight segments 200 shown in the Figures are, in reality, curved sections of the annular stator. In each case, it may be assumed that the pattern shown in the diagram is repeated about the entire stator. The first coil set s1 of the first multi-phase coil system S1 comprises three windings labelled A1, B1, -C1. Similarly, the second coil set s2 of the second multi-phase coil system S2 comprises three windings labelled A2, B2, -C2. The windings with their labels are depicted using a typical sign convention to indicate the current flow direction.

Figure 6:
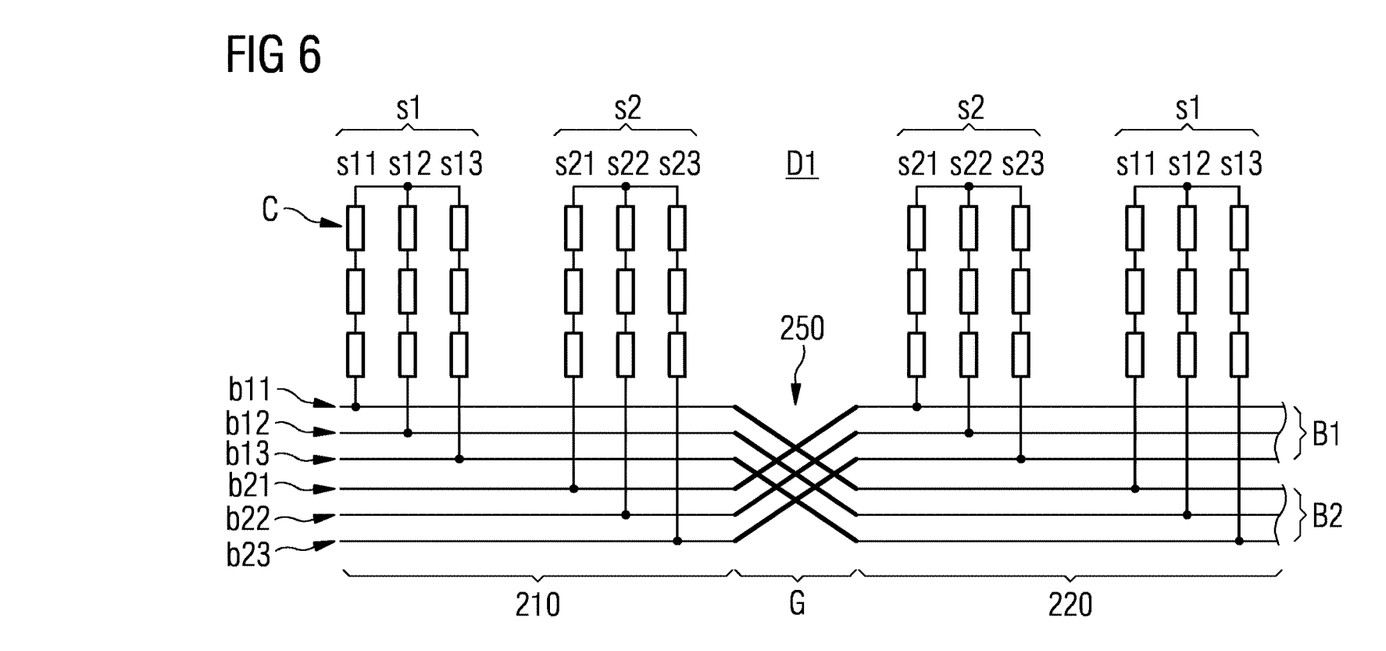
FIG. 6 shows a first multi-phase coil system distribution D1 according to an embodiment of the invention.
Figure 8:
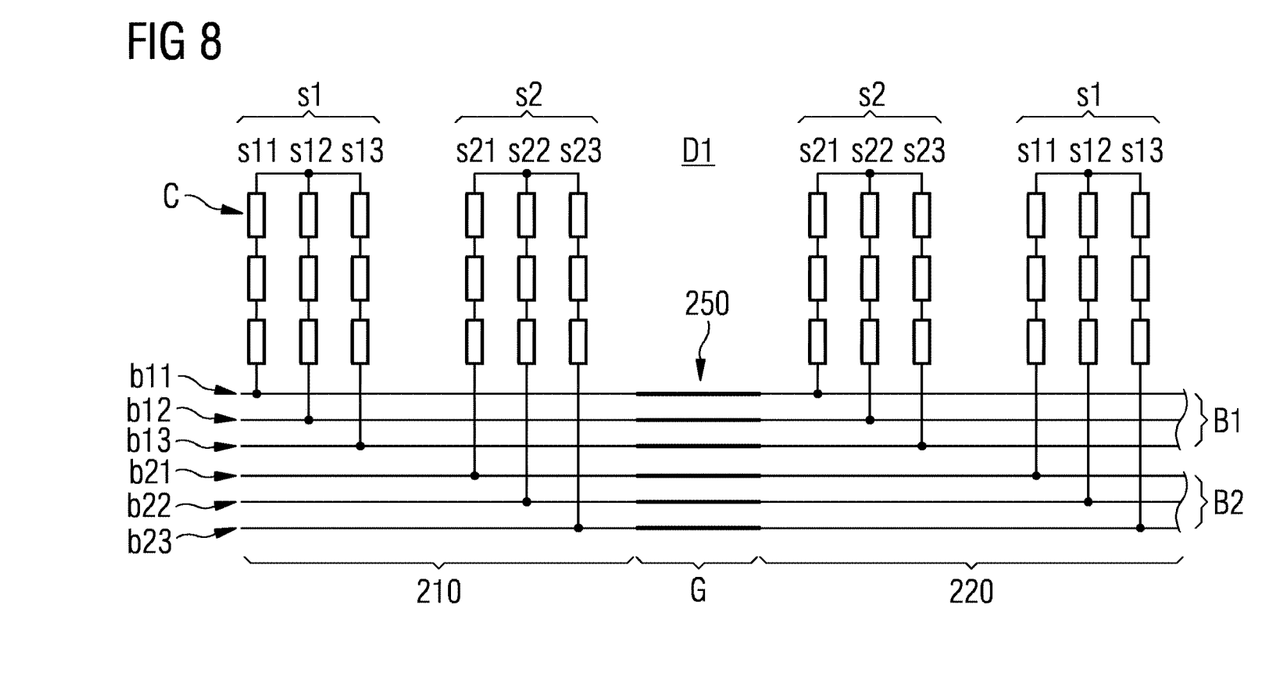
FIG. 8 shows a first multi-phase coil system distribution D1 according to a further embodiment of the invention.

FIGS. 6 and 8, referring to the first multi-phase coil system distribution D1, and FIGS. 10 and 12, referring to the second multi-phase coil system distribution D2, respectively show a stator assembly 110 comprising: a first stator segment 210, and a second stator segment 220, wherein the first stator segment 210 and the second stator segment 220 are arranged along a circumferential direction of the stator assembly 110, and wherein the first stator segment 210 and the second stator segment 220 are located adjacent to each other and are separated by a gap G. The stator assembly 110 further comprises: one first coil set s1 of the first multi-phase coil system S1, and one second coil set s2 of the second multi-phase coil system S2. Each coil set s1, s2 comprises one coil s11, s12, s13, s21, s22, s23 for each phase u, v, w of the respective multi-phase coil system S1, S2. Each stator segment 210, 220 comprises a first busbar arrangement B1 having first busbar elements b11, b12, b13, and a second busbar arrangement B2 having second busbar elements b21, b22, b23, each busbar element b1, b2 is assigned to one phase u, v, w. The stator assembly 110 further comprises: a segment-to-segment connector 250 connecting each busbar element b1, b2 of the first stator segment 210 to one busbar element b1, b2, assigned to the same phase, of the first busbar arrangement B1 or the second busbar arrangement B2 of the adjacent second stator segment 220, thereby electrically bridging the gap G. Hereby, in each segment 210, 220, each coil of the coil sets s1, s2 is connected to one busbar element b1, b2 assigned to the same phase of the first busbar arrangement B1 or the second busbar arrangement B2.

Each multi-phase coil system S1, S2 comprises three phases u, v, w. Each coil set s1, s2 comprises a first coil s11, s21 being assigned to the first electric phase u of the three-phase current, a second coil s12, s22 being assigned to the second electric phase v of the three-phase current, and a third coil s13, s23 being assigned to the third electric phase w of the three-phase current. Furthermore, each busbar arrangement B1, B2 comprises a first busbar phase element b11, b21 being assigned to the first electric phase u of the three-phase current, a second busbar phase element b12, b22 being assigned to the second electric phase v of the three-phase current, and a third busbar phase element b13, b23 being assigned to the third electric phase w of the three-phase current.

FIGS. 5 and 7 respectively show the first multi-phase coil system distribution D1, wherein each stator segment 210, 220 carries both, the first multi-phase coil system S1 and the second multi-phase coil system S2. With respect to the gap G between the first stator segment 210 and the second stator segment 220, the arrangement of coil sets s1, s2 carried by the first stator segment 210 is a mirror image of the arrangement of coil sets s2, s1 carried by the adjacent second stator segment 220. The same holds true for a further stator segment 230 adjacent to the first stator segment 210, wherein the arrangement of the coil sets s1, s2 is a mirror image with respect to the first stator segment 210. In the same manner, another further stator segment 200 adjacent to the second stator segment 220 has an arrangement of the coil sets s1, s2 being a mirror image with respect to the second stator segment 220.

FIG. 6 specifically shows an exemplary embodiment wherein each first busbar element b11, b12, b13 of the first busbar arrangement B1 of the first stator segment 210 is connected to the second busbar element b21, b22, b23, which is assigned to the same phase u, v, w, of the second busbar arrangement B2 of the second stator segment 220. Furthermore, each second busbar element b21, b22, b23 of the second busbar arrangement B2 of the first stator segment 210 is connected to the first busbar element b11, b12, b13, which is assigned to the same phase u, v, w, of the first busbar arrangement B1 of the second stator segment 220.

Thus, the busbar arrangements B1, B2 of adjacent stator segments 210, 220 are connected in a crosswise manner. Hereby, each coil element C comprises twenty turns and three coil elements C are connected in series within one coil assigned to one specific phase u, v, w, such that each coil comprises sixty turns.

More specifically, each coil s11, s12, s13 of the first coil set s1 of the first stator segment 210 is connected to the first busbar element b11, b12, b13, which is assigned to the same phase u, v, w, of the first busbar arrangement B1 of the first stator segment 210. Each coil s21, s22, s23 of the second coil set s2 of the first stator segment 210 is connected to the second busbar element b21, b22, b23, which is assigned to the same phase u, v, w, of the second busbar arrangement B2 of the first stator segment 210. Each coil s21, s22, s23 of the second coil set s2 of the second stator segment 220 is connected to the first busbar element b11, b12, b13, which is assigned to the same phase u, v, w, of the first busbar arrangement B1. Each coil s11, s12, s13 of the first coil set s1 of the second stator segment 220 is connected to the second busbar element b21, b22, b23, which is assigned to the same phase u, v, w, of the second busbar arrangement B2 of the second stator segment 220.

FIG. 8 shows an exemplary embodiment wherein each first busbar element b11, b12, b13 of the first busbar arrangement B1 of the first stator segment 210 is connected to the first busbar element b11, b12, b13, which is assigned to the same phase u, v, w, of the first busbar arrangement B1 of the second stator segment 220. Furthermore, each second busbar element b21, b22, b23 of the second busbar arrangement B2 of the first stator segment 210 is connected to the second busbar element b21, b22, b23, which is assigned to the same phase u, v, w, of the second busbar arrangement B2 of the second stator segment 220.

Each coil s11, s12, s13 of the first coil set s1 of the first stator segment 210 is connected to the first busbar element b11, b12, b13, which is assigned to the same phase u, v, w, of the first busbar arrangement B1 of the first stator segment 210. Furthermore, each coil s21, s22, s23 of the second coil set s2 of the first stator segment 210 is connected to the second busbar element b21, b22, b23, which is assigned to the same phase u, v, w, of the second busbar arrangement B2 of the first stator segment 210. Each coil s21, s22, s23 of the second coil set s2 of the second stator segment 220 is connected to the second busbar element b21, b22, b23, which is assigned to the same phase u, v, w, of the second busbar arrangement B2 of the second stator segment 220, and each coil s11, s12, s13 of the first coil set s1 of the second stator segment 220 is connected to the first busbar element b11, b12, b13, which is assigned to the same phase u, v, w, of the first busbar arrangement B1 of the second stator segment 220.

Hereby, each coil element C comprises multiple turns (for example twenty) and three coil elements C are respectively connected in series within one coil assigned to one phase u, v, w, such that each coil comprises sixty turns (for example).

FIGS. 9 and 11 specifically show a second multi-phase coil system distribution D2, wherein each single stator segment 200 carries either only coil sets s1, s2 of the first multi-phase coil system S1 or of the second multi-phase coil system S2. In this manner, each stator segment 200 comprises only one multi-phase coil system S1, S2. The first stator segment 210 carries only a first coil set s1 assigned to the first multi-phase coil system S1. The adjacent second stator segment 220 and the adjacent further stator segment 230 carry in turn only a second coil set s2 assigned to the second multi-phase coil system S2, respectively. The same holds true for another further stator segment 200 which is adjacent to the second stator segment 220 and carries only a first coil set s1.

According to FIGS. 10 and 12, each first busbar element b11, b12, b13 of the first busbar arrangement B1 of the first stator segment 210 is connected to the second busbar element b21, b22, b23 assigned to the same phase of the second busbar arrangement B2 of the second stator segment 220. Furthermore, each second busbar element b21, b22, b23 of the second busbar arrangement B2 of the first stator segment 210 is connected to the respective first busbar element b11, b12, b13 assigned to the same phase of the first busbar arrangement B1 of the second stator segment 220. The connection is hereby realized by flexible segment-to-segment connectors 250.

FIG. 10 specifically shows an exemplary embodiment, wherein each coil comprises six coil elements C. The coil elements C within each coil are connected in series. Hereby, each coil element C comprises multiple turns (for example ten). Because six coil elements C are respectively connected in series within one coil, each coil comprises sixty turns.

FIG. 12 specifically shows an exemplary embodiment, wherein each coil comprises six coil elements C and each coil comprises two coil element subsets a, b, c. Each coil element C is assigned to one coil element subset a, b, c, wherein each coil element subset a, b, c comprises three coil elements C. The coil element subsets a, b, c of each coil are connected in parallel, and the coil elements C of each coil element subset a, b, c, are connected in series. Hereby, each coil element C comprises multi turns (for example twenty) and three coil elements C are connected in series per coil element subset a, b, c. Thus, each coil element subset a, b, c comprises sixty turns.

Figure 13:
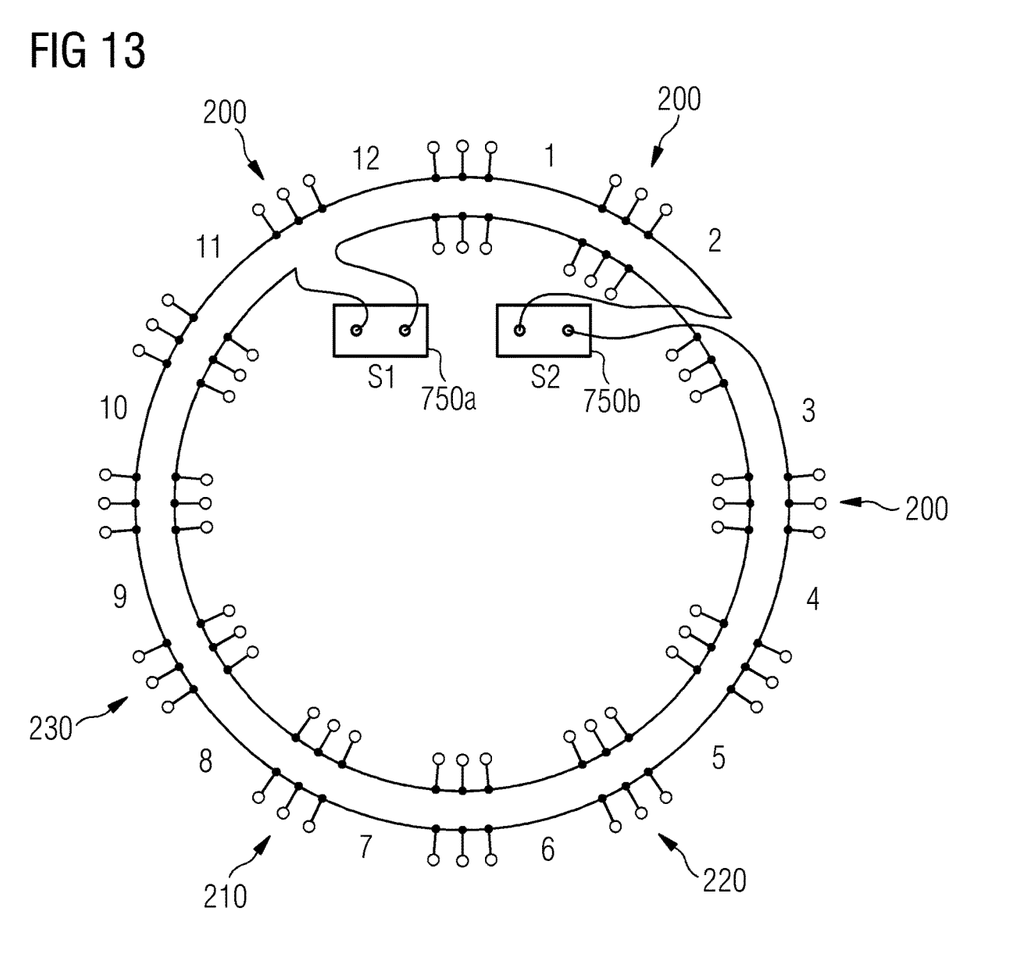
FIG. 13 illustrates an electrical connection of two multi-phase coil systems in the stator assembly according to an embodiment of the invention.

FIG. 13 shows an exemplary embodiment of the electrical connection of the two multi-phase coil systems S1, S2 within the stator assembly 110. The stator assembly 110 comprises twelve segments 200, wherein always two adjacent stator segments 200 are connected in parallel. The segment-to-segment connection is done in each case using flexible segment-to-segment connectors 250. Each multi-phase coil system S1, S2 is connected with two cable outlets 750a, 750b per system S1, S2 to a converter (not depicted), respectively.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stator assembly comprising:
a first stator segment;
a second stator segment;
the first stator segment and the second stator segment being arranged along a circumferential direction of the stator assembly,
wherein the first stator segment and the second stator segment are located adjacent to each other and are separated by a gap;
   at least one first coil set of a first multi-phase coil system, and
   at least one second coil set of a second multi-phase coil system,
wherein each coil set includes at least one coil for each phase of the respective multiphase coil system;
wherein each stator segment includes
   a first busbar arrangement having first busbar elements, and
   a second busbar arrangement having second busbar elements, each busbar element being assigned to one phase,
   a segment-to-segment connector connecting each busbar element of one busbar arrangement of the first stator segment to one busbar element assigned to the same phase of one busbar arrangement of the adjacent second stator segment, thereby electrically bridging the gap;
wherein, in each segment, each coil of the coil sets is connected to one busbar element assigned to the same phase of the first busbar arrangement or the second busbar arrangement;
wherein, in a first multi-phase coil system distribution, each stator segment carries both, the first and the second multi-phase coil systems, wherein, with respect to the gap between the first stator segment and the second stator segment, the arrangement of coil sets carried by the first stator segment is a mirror image of the arrangement of coil sets carried by the adjacent second stator segment;
or
wherein, in a second multi-phase coil system distribution, each single stator segment carries either only coil sets of the first multi-phase coil system or of the second multi-phase coil system.

2. The stator assembly according to claim 1,
wherein, in the first multi-phase coil system distribution,
each coil of the first coil set of the first stator segment is connected to the first busbar element, which is assigned to the same phase, of the first busbar arrangement of the first stator segment,
wherein each coil of the second coil set of the first stator segment is connected to the second busbar element, which is assigned to the same phase, of the second busbar arrangement of the first stator segment,
wherein each coil of the second coil set of the second stator segment is connected to the second busbar element, which is assigned to the same phase, of the second busbar arrangement of the second stator segment, and
wherein each coil of the first coil set of the second stator segment is connected to the first busbar element, which is assigned to the same phase, of the first busbar arrangement of the second stator segment.

3. The stator assembly according to claim 1,
wherein, in the first multi-phase coil system distribution,
each first busbar element of the first busbar arrangement of the first stator segment is connected to the second busbar element, which is assigned to the same phase, of the second busbar arrangement of the second stator segment, and
wherein each second busbar element of the second busbar arrangement of the first stator segment is connected to the first busbar element, which is assigned to the same phase, of the first busbar arrangement of the second stator segment.

4. The stator assembly according to claim 3,
wherein each coil of the first coil set of the first stator segment is connected to the first busbar element, which is assigned to the same phase, of the first busbar arrangement of the first stator segment,
wherein each coil of the second coil set of the first stator segment is connected to the second busbar element, which is assigned to the same phase, of the second busbar arrangement of the first stator segment,
wherein each coil of the second coil set of the second stator segment is connected to the first busbar element, which is assigned to the same phase, of the first busbar arrangement, and
wherein each coil of the first coil set of the second stator segment is connected to the second busbar element, which is assigned to the same phase, of the second busbar arrangement of the second stator segment.

5. The stator assembly according to claim 1,
wherein, in the first multi-phase coil system distribution,
each coil includes at least two coil elements, and
wherein the coil elements, of each coil assigned to the same phase are connected in series.

6. The stator assembly according to claim 1,
wherein, in the second multi-phase coil system distribution,
each coil includes at least two coil elements, and
wherein the coil elements, of each coil assigned to the same phase are connected in series.

7. The stator assembly according to claim 1, wherein, in the second multi-phase coil system distribution,
each coil includes at least two coil elements and each coil includes at least two coil element subsets,
wherein each coil element is assigned to one coil element subset comprising at least two coil elements,
wherein the coil element subsets of each coil are connected in parallel, and
the coil elements of each coil element subset, are connected in series.

8. The stator assembly according to claim 1,
wherein the segment-to-segment connector is a flexible electrical connector, in particular comprising copper or aluminum, which is configured to changeably connect one of the busbar elements of one busbar arrangement of the first stator segment to one of the busbar elements assigned to the same phase of the first busbar arrangement or of the second busbar arrangement of the second stator segment.

9. The stator assembly according to claim 1,
wherein each multi-phase coil system includes three phases;
wherein each coil set includes
a first coil being assigned to the first electric phase of a three-phase current,
a second coil being assigned to the second electric phase of the three-phase current,
a third coil being assigned to the third electric phase of the three-phase current; and
wherein each busbar arrangement includes
a first busbar phase element being assigned to the first electric phase of a three-phase current,
a second busbar phase element being assigned to the second electric phase of the three-phase current,
a third busbar phase element being assigned to the third electric phase of the three-phase current.

10. The stator assembly according to claim 1,
comprising at least four further stator segments.

11. The stator assembly according to claim 1,
comprising a third multi-phase coil system.

12. An electric generator, in particular an electric generator for a wind turbine, the electric generator comprising
a stator assembly as set forth in claim 1, and
a rotor assembly, which is configured and supported such that it can rotate around a center axis;
in particular wherein the electric generator has an inner stator—outer rotor configuration.

13. The electric generator as set forth in claim 12,
wherein an outer annular frame of the stator assembly has an outer diameter larger than one of 7 m, 8 m, and 9 m.

14. A wind turbine for generating electrical power, the wind turbine comprising
a tower;
a wind rotor, which is arranged at a top portion of the tower and which includes at least one blade; and
an electric generator as set forth in claim 12, wherein the electric generator is mechanically coupled with the wind rotor.

* * * * *